Figure 1:
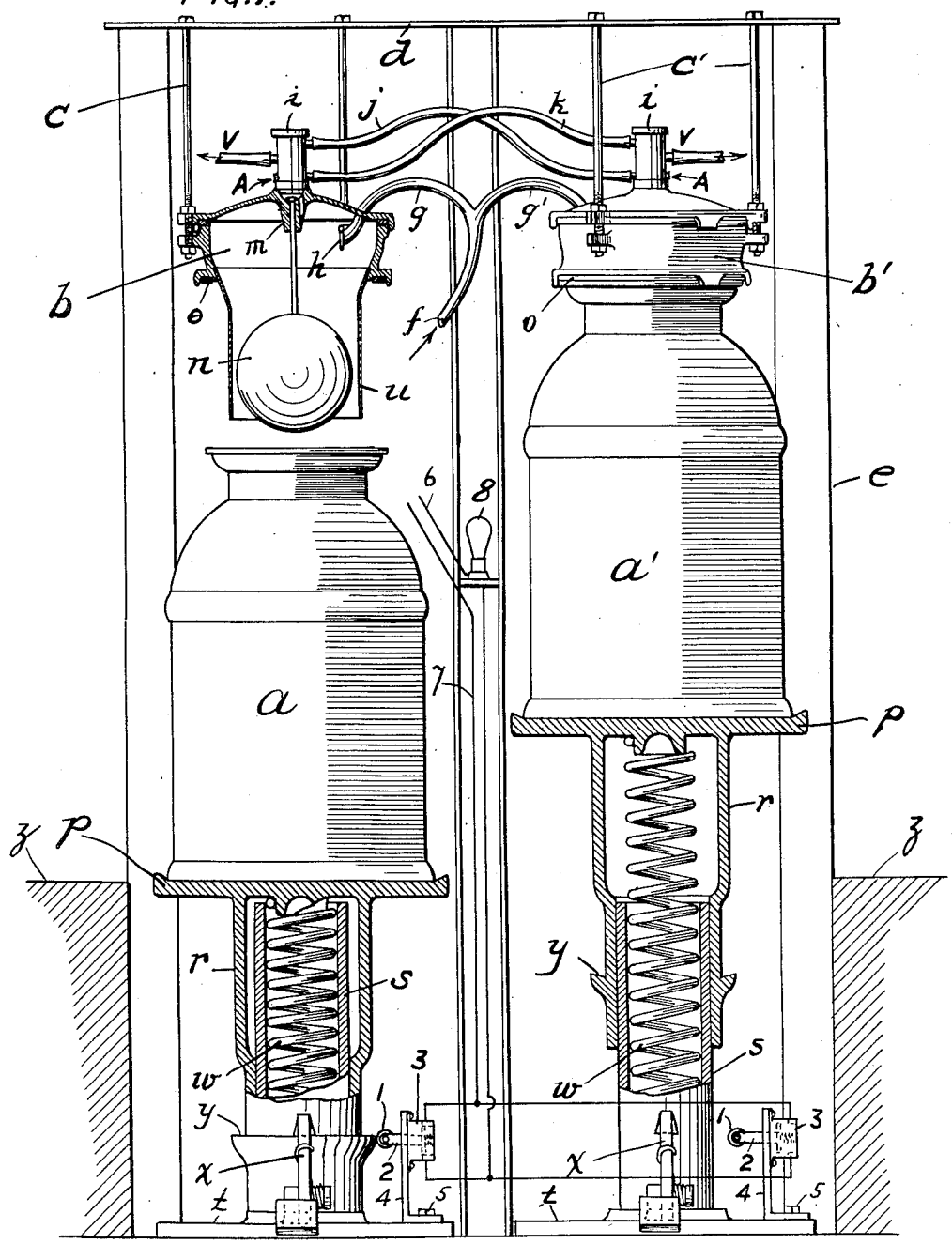

July 30, 1935.     C. H. HAPGOOD     2,009,400
CONTINUOUS MILK DELIVERY SYSTEM
Filed Sept. 19, 1931     2 Sheets-Sheet 1

WITNESS:

INVENTOR
Cyrus Howard Hapgood
BY
ATTORNEYS.

July 30, 1935. C. H. HAPGOOD 2,009,400
CONTINUOUS MILK DELIVERY SYSTEM
Filed Sept. 19, 1931   2 Sheets-Sheet 2

INVENTOR
Cyrus Howard Hapgood
BY
ATTORNEYS.

Patented July 30, 1935

2,009,400

UNITED STATES PATENT OFFICE 2,009,400

CONTINUOUS MILK DELIVERY SYSTEM

Cyrus Howard Hapgood, Nutley, N. J., assignor to The De Laval Separator Company, New York, N. Y., a corporation of New Jersey Application September 19, 1931, Serial No. 563,780

13 Claims. (Cl. 226—116)

In an application filed by me June 13, 1931, Ser. No. 544,109, on which issued February 16, 1932, Patent No. 1,844,956, I set forth a continuous delivery system comprising two tanks having inlets for milk, and valves, one for each tank, each valve being adapted to be moved to admit air to its corresponding tank and cause the other valve to be moved to connect the other tank with vacuum. Each valve is moved to admit air to its corresponding tank when the milk in such tank reaches a predetermined level.

In an earlier application filed by me and on which issued, July 7, 1931, Patent No. 1,813,238, is disclosed another two tank system of the same generic type, wherein there is a single valve operable, when the milk flowing into a tank reaches a predeterm. ied level, to connect such tank with the atmosphere and to connect the other tank with vacuum.

In either system, as soon as air is admitted to a tank, an automatic valve on a discharge spout opens, under the pressure of the milk, and the milk flows into a receiver. While a tank is under vacuum and receiving milk, as above described, this automatic valve is held closed by pressure of the atmosphere.

It would be advantageous to utilize these two tanks as ultimate receivers, but it would not only be difficult to determine when a tank is filled, but it would be difficult or impossible to remove the tank without rupturing the necessarily permanent connections between the tanks. The object of the present invention is to reconstruct the apparatus so that the two tanks may be used as ultimate receivers, the operator being notified when the tank is filled and vacuum shut off and provision being made for the easy removal of the tank and its replacement by another tank.

Figure 2:
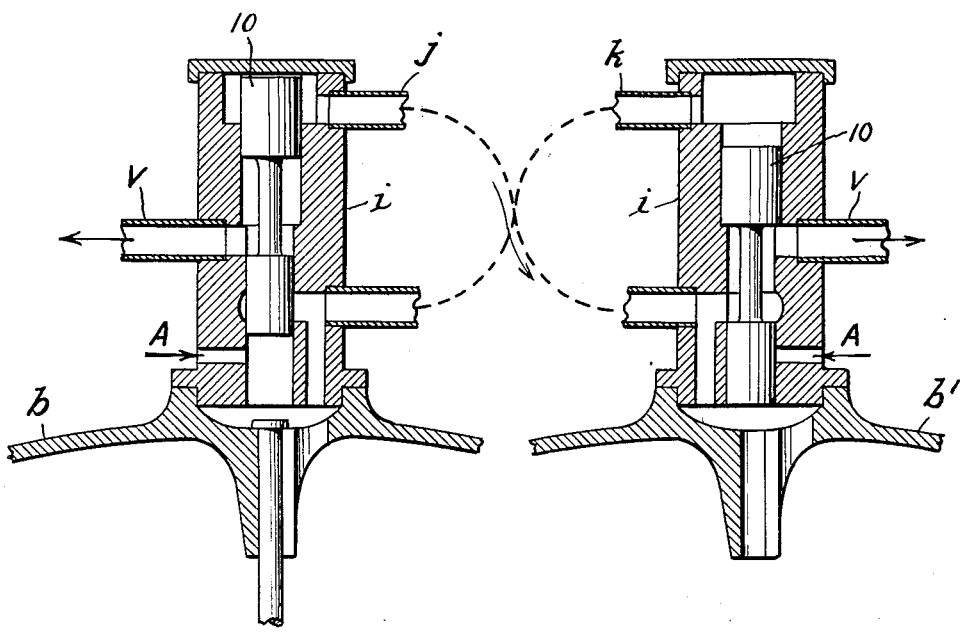

In the drawings, which illustrate one embodiment of the invention:

Fig. 1 is an elevation, partly in section, of the entire continuous delivery mechanism, including also a diagram of the signal-operating means whereby the operator is notified when a can is filled. Fig. 2 is a vertical sectional view of the two valves controlling the admission of air to, and exhaust of air from, the respective milk cans, the two valves being shown in opposite positions.

Each of the two milk tanks or cans is made in two readily separable parts, namely, a body ($a$ or $a'$) and a head ($b$ or $b'$). The heads are suspended from hangers $c$ rigidly secured to a cross bar $d$ of a frame $e$.

The milk from the teat cups of any milking machine (not shown) flows through a pipe $f$ and there through either of the branch pipes $g$ or $g'$ extending respectively through the heads $b$ and $b'$. On the discharge end of each branch pipe is a valve $h$ which opens when the corresponding can is under suction (partial vacuum) and closes when the corresponding can is under atmospheric or other relatively high absolute pressure.

Mounted on each head is a valve casing $i$ having an atmospheric port A and a port connected with a vacuum pipe V. Each valve casing is also provided, near its upper and lower ends, with two other ports which are respectively connected, through pipes $j$ and $k$, with lower and upper ports in the other valve casing.

Depending from the head of each can is a boss $m$ having a central opening through which extends the stem of a float $n$.

When the valve 10 in either valve casing is lowered, it connects its corresponding can with a vacuum port V. When such valve is raised by the corresponding float $n$, it connects its corresponding can with an atmospheric port A. When a valve is thus lifted to connect the corresponding can with the atmosphere, it admits air, through one of the cross connecting pipes $j$ or $k$, to the top of the other valve casing and moves the corresponding valve down, thereby connecting the corresponding can with its vacuum port V. This operation is described in detail in said Patent No. 1,844,956. Instead of using the described means for shutting off the vacuum from, and admitting air to, one can and thereby shutting off the air from the other can and connecting it with vacuum, the mechanism of Patent 1,813,238 may be employed. Any other efficient mechanism for effecting this mode of operation may be employed, my invention comprehending the use of any operative mechanism.

In the present invention, the body of each can is made readily movable, vertically, toward or from the fixed head, the head being provided with a gasket $o$ to enable the body to make a good joint with the head when the body is moved against the head.

I prefer, also, to provide each can head with a depending hood $u$ adapted to enclose the float and guide the neck of the can body in its upward movement, so as to insure its proper seating against the head.

Each can body is mounted on a vertically movable support, which may comprise a platform $p$ having depending therefrom a tube $r$ sleeved and slidable on a tube $s$ secured to a base $t$. Within each pair of tubes is a coil spring $w$ engaging the bottom of the platform $p$ and capable of moving the can body up against its fixed head and holding it there during inflow of milk until the can body is filled with milk and air admitted thereto above the milk column.

In the drawings the right hand can body $a'$ is thus held by the spring $w$ against the head $b'$. The connection is air-tight because the can body is held tightly against its head, after the body is moved against the head by the spring, by atmospheric pressure, the interior of the can being under vacuum as hereinbefore described.

The spring is strong enough to hold the can body against its head as the weight increases by reason of the continuous inflow of milk, as long as the can is under vacuum; but when, as hereinbefore described, the milk rises to a definite height and, through the float, shifts the valve, thereby admitting air to the can, the pressure of the air, plus the weight of the can body and of the milk contained therein, are sufficient to force the can body down against the spring until it reaches the position occupied by the can body $a$ in the drawings, at which position a spring-actuated latch or hook $x$ engages a flange $y$ on the tube $r$ and arrests the downward movement of the can body, besides positively holding the platform $p$ in its lower position, which is conveniently on a level with the floor $z$.

When the can body, filled with milk, is in this position, namely, the position of can body $a$ in the drawings, the can body may be readily removed and an empty can substituted. The spring latch may then be released by foot and the spring $w$ will lift the empty can body against its head, in position to receive milk as soon as it is connected with vacuum, as it will be when the other can is filled.

In order to avoid the necessity of contant attendance of the operator, it is desirable that he should be notified, by some visible or audible signal, when a can is filled, so that he may be free to attend to other work while a can is being filled. In order to accomplish this purpose the following mechanism is provided.

Attached to the stem 2 of an electric switch 3 is a roller 1 which is in position to be engaged by the sleeve $r$ depending from the platform $p$ (preferably by the peripheral cam surface of the flange $y$) when it reaches its lowest position. The switch is of the standard commercial type in which the electrical circuit is closed when the stem is pushed in and automatically opens when the pressure on the stem is removed. A switch is provided for each can and its operating mechanism, the switches being secured to brackets 4 attached to bases $t$ by cap screws 5.

The downward movement of sleeve $r$ causes flange $y$ to contact with roller 1 and push in stem 2 thereby closing the circuit. When sleeve $r$ rises flange $y$ releases roller 1 and stem 2, thereby opening the circuit.

The wires 6 and 7 illustrate an electric circuit including the switches and any signal, such as an electric lamp 8, operable by the closure of the circuit.

On the drawings, the switch for can $a$ is shown closed and the switch for can $a'$ is shown open.

What I claim and desire to protect by Letters Patent is:

1. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree; fixed heads one for each can body, and means to move each can body toward and from its fixed head.

2. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree; fixed heads one for each can body, and springs one for each can body, each spring being adapted to lift its corresponding can body and seat it against its corresponding head.

3. A continuous milk delivery system comprising a milk inlet adapted to deliver milk to each of two removable and replaceable can bodies having open tops, hollow can heads from which said can bodies are removable, means to connect one can body with a source of relatively high pressure and the other can body with a source of relatively low pressure and to reverse the connections when the can body under low pressure is filled to the desired degree; and springs one adapted to lift each can body, the corresponding can body when so lifted being adapted to seat against the corresponding head and to be held by its spring and by external atmospheric pressure in substantially air-tight connection therewith, during the flow of milk into the can body, while it is under internal low pressure.

4. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree; and springs one adapted to lift each can body and seat it against its corresponding head, the spring being sufficiently strong, together with the unbalanced pneumatic pressure within and without the can body, to hold the can body against the head until the can body is filled to the desired degree and the pneumatic pressure within the can body raised, the spring not being sufficiently strong to then uphold the can body, whereupon the can body moves down against the pressure of the spring.

5. A continuous milk delivery system comprising a milk inlet adapted to deliver milk to each of two removable and replaceable can bodies, means to connect one can body with a source of relatively high pressure and the other can body with a source of relatively low pressure and to reverse the connections when the can body under low pressure is filled to the desired degree, fixed heads one for each can body, supports, one for each can body, each support being vertically movable toward and from the corresponding head, a spring adapted to lift each support and thus seat the can body against the head, and means to hold each support in a relatively low position during the removal of a filled can and its replacement by an empty can.

6. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree, fixed heads one for each can body, vertically movable platforms adapted to support the respective can bodies, means to lock the platform in a lower position during the removal of one filled can body and its replacement by an empty can body, and a spring tending to lift the platform and thereby move the can body into engagement with the head, said locking means being releasable to allow the spring to so act.

7. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree; fixed heads one for each can body, vertically movable platforms adapted to support the respective can bodies, a tube depending from each platform, a fixed tube which the first named tube slidably engages, and a coil spring enclosed by said tubes and engaging the bottom of the platform.

8. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can under low pressure is filled to the desired degree; fixed heads one for each can body, each can body being vertically movable toward and from said head, springs each adapted to lift one of the can bodies and seat it against the corresponding head, the spring being sufficiently strong, together with the unbalanced pneumatic pressure within and without the can, to hold the can body against the head until the can body is filled to the desired degree and the pneumatic pressure within the can body raised, the spring not being sufficiently strong to then uphold the can body, whereupon the can body moves down against the pressure of the spring, and an automatic lock adapted to limit the downward movement of the can body and hold the can body at a definite level to permit it to be removed and replaced by an empty can body, said lock being manually operable to allow the empty can body to be lifted into engagement with its head.

9. A milk delivery system comprising a relatively stationary hollow head and a platform adapted to support a can body, means to move the platform upward to thereby move the can body upward against such head and into milk filling position, means to admit milk to the can body and means to maintain sub-atmospheric pressure within the can body during the flow of milk thereinto and to raise said pressure to approximately atmospheric and to arrest inflow of milk thereinto when filled to a predetermined degree, exterior atmospheric pressure holding the can body in air-tight engagement with its head during delivery of milk thereto, said moving means yieldingly holding the platform in an upward position against the can body while in milk filling position but allowing the platform to move downward when subjected to the weight of a filled can body, said can body together with its platform being movable downward by the weight of the milk in the can body upon the rise of pressure therein and the cessation of delivery of milk thereto, to enable it to be removed and replaced by an empty can body, which is then by the upward movement of the platform movable upward into position to receive milk.

10. A continuous milk delivery system comprising a milk inlet adapted to deliver milk to each of a pair of removable and replaceable can bodies, hollow can heads from which said can bodies are removable, means adapted to simultaneously connect one can body with a source of relatively high pressure and the other can body with a source of relatively low pressure whereby milk is admitted to the latter can body, means operable in the filling of the latter can body while under low pressure to reverse said connections and thereby admit milk to only the first named can body, movable platforms by means of which said can bodies respectively are moved into milk receiving position and upon which they rest during the milk filling operation, each can body, after said reversal of connections, being movable, together with the platform on which it rests, by said high pressure and its filled weight, from its upper milk receiving position in air-tight contact with its head to a lower position away from its head to enable it to be removed and refilled with an empty can body, and means to raise the platform and thereby move the can body upward against its head into position to receive milk upon the next reversal of connections.

11. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree; each can body, after said reversal of connections, being movable, by said high pressure and its filled weight, from an upper milk receiving position to a lower position to enable it to be removed and replaced by an empty can body, and a spring adapted to move an empty can body from its lower position to its upper milk receiving position and to hold it in such upper position until after it is filled and connected with high pressure, whereupon the force of the spring is overcome and the can body moved down as specified.

12. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree; a vertically movable support for each can body, a spring for each support, adapted to move it and its supported can body upward and hold the can body in its upper milk-receiving position until after it is filled and connected with high pressure, whereupon its filled weight plus said high pressure overcomes the weight of the spring and moves it and its support downward, and a manually releasable locking device adapted to hold each can body support in its lower position to allow the filled can body to be removed and replaced by an empty can body.

13. A continuous milk delivery system comprising a milk inlet adapted to deliver milk to each of a pair of removable and replaceable can bodies, means to connect one can body with a source of relatively high pressure and the other can body with a source of relatively low pressure and to reverse the connections when the can body under low pressure is filled to the desired degree; said can bodies being vertically movable, a spring for each can body adapted to move it upward and hold it in its upper milk-receiving position until after it is filled and connected with high pressure, whereupon its filled weight plus said high pressure overcomes the weight of the spring and moves it downward, a signal, operable in the downward movement of each can body, to notify the operator to remove the filled can body and replace it with an empty can body, and manually controllable means adapted to hold the spring from action during said removal and replacement.

CYRUS HOWARD HAPGOOD.